United States Patent [19]

Simpson

[11] Patent Number: 4,692,476
[45] Date of Patent: Sep. 8, 1987

[54] COMPLEX BLOCK MULTIPOLYMER SURFACTANTS

[75] Inventor: Scott Simpson, Woodstock, Conn.

[73] Assignee: Rogers Corporation, Rogers, Conn.

[21] Appl. No.: 727,544

[22] Filed: Apr. 26, 1985

Related U.S. Application Data

[63] Continuation of Ser. No. 559,823, Dec. 9, 1983, abandoned.

[51] Int. Cl.$^4$ .......................... C08G 77/04; C08J 9/00
[52] U.S. Cl. .................................... 521/112; 521/116; 521/155; 525/474; 528/28; 528/29; 528/33
[58] Field of Search .......................... 528/28; 556/414; 521/112, 155, 116; 525/474

[56] References Cited

U.S. PATENT DOCUMENTS

| | | | |
|---|---|---|---|
| 3,246,048 | 4/1966 | Haluska | 528/28 |
| 3,398,172 | 8/1968 | Damm et al. | 528/28 |
| 3,483,240 | 12/1969 | Boudreau | 528/28 |
| 4,202,807 | 5/1980 | Moretto et al. | 528/28 |

FOREIGN PATENT DOCUMENTS 0975727  11/1982  U.S.S.R. .............................. 528/28

Primary Examiner—Wilbert J. Briggs, Sr.
Attorney, Agent, or Firm—Fishman & Dionne

[57] ABSTRACT

Complex block multipolymer surfactants comprising (a) a siloxane polymer terminated with groups containing a hydroxyl(—OH), (b) one or more diols and (c) a diisocyanate and foam compositions of polyurethane employing said surfactants as a stabilizer.

17 Claims, No Drawings

COMPLEX BLOCK MULTIPOLYMER SURFACTANTS

This application is a continuation of application Ser. No. 559,823, filed Dec. 9, 1983, now abandoned.

BACKGROUND OF THE INVENTION

This invention relates to novel complex block multipolymer surfactants for urethane systems and compositions of polyurethane foams containing such surfactants. More specifically, the present invention relates to a surfactant comprising a hydroxyl terminated polysiloxane, one or more diols and a diisocyanate.

The primary advantage of the present invention resides in the ability to tailor a surfactant for a particular urethane formulation or group of formulations. Specifically, while the siloxane is used for its surface active properties, the diisocyanate is employed as a linking agent for combining the hydroxyl terminated siloxane and the diol or diols forming urethane linking groups.

By choosing particular combinations of isocyanates, alcohols and siloxanes which have particular solubilities in a desired urethane system, a surfactant which will stabilize the foam of that system can be produced. This is particularly desirable in that the isocyanates and alcohols employed in the production of the surfactant can be generic to urethane manufacture and, in many cases, similar or identical components can be used in the manufacture of the surfactant as are used in the urethane formulation to be stabilized. The simple manufacturing procedures involved and the ability to use commercially available components results in a low cost surfactant.

Other advantages of the present invention include:

a. controlling the molecular weight of the surfactant polymer by adjusting the isocyanate to the multicomponent hydroxyl ratio;

b. controlling the molecular weight distribution of the surfactant polymer by adjusting the distribution of raw materials and by modifying the reaction sequences;

c. controlling the surface activity of the product via the amount of siloxane in the product by varying the ratio of siloxane in the multicomponent raw material mix;

d. producing surfactants with only small amounts of siloxane, e.g., in amounts as low as 2.0% by weight polydimethylsiloxane;

e. controlling molecular weight and molecular weight distribution by the addition of monofunctional components;

f. production of a branched surfactant by the addition of components having a functionality of greater than two;

g. ability to utilize amine terminated components in addition to or in substitution for hydroxyl terminated components.

Organosilicone polymers which are useful in the formation of polyurethane foams are disclosed in U.S. Pat. No. 4,022,722 to the Union Carbide Corporation. Said organic polysiloxane surfactants may be generally characterized as a linear alternating block copolymer of a siloxane and a polyoxyalkylene and may be represented by the following:

~SOSOSOSOSOSOSO~ where
S represents

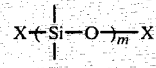

and
O represents Y$-$(Z$)_n$Y and wherein
Z is a polyoxyalkylene and
X has reacted with Y
Said components have been found quite useful in stabilizing polyurethane foams.

In contrast to the linear alternating block copolymer disclosure in the prior art, the surfactants of the present invention may be generally characterized as complex block multipolymers with a total molecular weight of from about 10,000 to 100,000 in which a diisocyanate is used to link together two or more hydroxyl terminated blocks resulting in a multicomponent surfactant with random or semi-ordered arrangement of the hydroxyl terminated blocks depending on the reaction sequence by which the surfactant is made (e.g., prepolymers) and/or the relative reaction rates between the various hydroxyl groups and the isocyanate. Examples of surfactants described by the present invention may be represented by the following:

~IAIAIAIAISISIAISI~

~ISIAISIAIAISIAIAISISIS~

~SIAIAISISIAIAISISIAIA~

~I(AI)$_r$SI(AI)$_t$S~ where
S represents

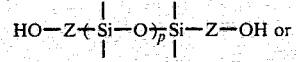

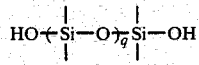

Z is a polymeric or non-polymeric carbon compound
I represents O=C=N$-$(L$)-$N=C=O
where
L is a polymeric or non-polymeric carbon compound
A represents HO$-$(R$)-$OH where R represents one or more polymeric and/or non-polymeric carbon compounds and the isocyanate $-$(NCO) and hydroxyl $-$(OH) groups have reacted to form urethane linkages. One such reaction may be generally represented by the following:

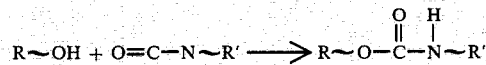

The siloxane block is typically a chain of recurring siloxane units and is present in amounts of from 2% to 50% by weight. In a preferred embodiment of this invention, the siloxane is polydimethylsiloxane and the preferable termination contains a carbinol group (C—OH). It should be noted that siloxanes with terminating groups that are themselves polymers can be employed so long as a hydroxyl group is present.

The diol component can be any one or a combination of any number of polymeric or non-polymeric materials chosen so as to have a particular compatibility/solubility in the urethane formulation that is to be ultimately stabilized. Examples of the kinds of materials that can be used include hydroxyl terminated:

polyoxyalkylenes(polyalkylene oxides)—polyethers such as polyethylene oxide and polypropylene oxide and/or combinations of same;

grafted polyoxyalkylenes—polymer polyols such as polyoxyalkylene with polystyrene and polyacrylonitrile grafted onto the polyoxyalkylene chain;

polyesters—polybutylene adipate, polycaprolactone, etc;

polybutadienes;

non-polymeric diols—1-4 butane diol, diethylene glycol, dipropylene glycol, etc.;

combinations of the above materials.

Examples of the diisocyanates that can be used in the practice of the present invention, which are also chosen so as to have particular compability/solubility in the urethane formulation to be stabilized, include:

MDI (diphenyl methane diisocyanate);

MDI prepolymers—MDI that has been pre-reacted with a polymeric or non-polymeric diol;

modified MDI—a mixture of pure MDI and trifunctional cycloadducts of MDI;

TDI (toluene diisocyanate)—both pure and mixtures of isomers;

TDI prepolymers;

aliphatic diisocyanates—such as hexamethylene diisocyanate.

The listings above should not be regarded as limiting by omission the materials that may be used. In the practice of this invention, monofunctional components may be used to control the molecular weight and distribution, and components with functionalities greater than two may be used to provide branching.

Amine terminated materials may be used in substitution for or in addition to the hydroxyl terminated materials. The amine group reacts with isocyanate to form urea linkages. This may be generally represented by the following:

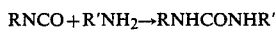

$$RNCO + R'NH_2 \rightarrow RNHCONHR'$$

In carrying out the process of the present invention, it is generally preferred that the components be mixed together at about room temperature and pressure. The following examples are provided to illustrate the present invention and are not to be regarded as limiting upon the scope thereof.

EXAMPLE 1

This example illustrates the production of a complex multipolymer surfactant utilizing a polyoxyalkylene diol, MDI partially extended with a low molecular weight polyether and a hydroxyl terminated polyoxyethylene capped polydimethylsiloxane.

Into a one-quart glass jar equipped with a stirrer and dry nitrogen blanketing were placed:

124.0 grams Dow Corning Q4-3667—hydroxyl terminated polyoxyethylene capped polydimethylsiloxane 251.2 grams Union Carbide E-351—polyoxypropylenediol 375.2 grams Monsanto A-215—linear alkyl benzene diluent 15.0 grams Linde 3A Molecular Sieve—water scavenger comprised of a crystalline metal aluminosilicate These ingredients were mixed at room temperature for one hour and then 47.1 grams UpJohn Isonate 181—MDI partially extended with a low molecular weight polyether diol forming a difunctional adduct was added and the batch was mixed for at least an additional 20 minutes, and then left standing to age at room temperature.

After aging at least one day, the surfactant produced was evaluated for use in a urethane foam system as follows:

Employing what is commonly referred to as the Hobart Test, 30.0 grams of the aged surfactant was added to the following mixture:

295.5 grams Union Carbide 34-45—a polystyrene and polyacrylonitrile grafted polyoxypropylene triol 54.4 grams Union Carbide PCP-0200—a polyester diol produced from caprolactone 43.2 grams dipropyleneglycol 155.6 grams UpJohn 143L—a mixture of MDI and a trifunctional cycloadduct produced by introducing carbodiimide linkages in the MDI The mix was whipped in a Kitchen Aid mixer (Model K5-SS) for four minutes and resulted in a froth having a density of 26 lbs/ft$^3$.

With the addition of an inert filler and a catalyst, the above-noted material produced a foam product of good cell structure and a density of about 14.5 lbs/ft$^3$ when processed using a mechanical frother and related equipment for producing mechanically frothed urethane foam.

EXAMPLE 2

This example illustrates the use of di 2-ethyl hexyl phthalate (DOP) as a carrier medium and the use of a catalyst in the system. Employing the same synthesis procedure as given in Example 1, a surfactant was prepared from the following:

124.0 grams Dow Corning Q4-3667

251.2 grams Union Carbide E-351

375.2 grams DOP—diluent 15.0 grams Linde 3A Molecular Sieve—water scavenger 0.813 grams MT Chemicals T-9—stannous octoate catalyst with antioxidant 47.1 grams UpJohn Isonate 181

The resultant surfactant had a Hobart density of 30.5 lbs/ft$^3$ and produced a high quality foam product having a density of about 12.3 lbs/ft$^3$ when processed as in Example 1.

EXAMPLE 3

This example illustrates the use of a grafted polyoxyalkylenes as the multifunctional alcohol component of the surfactant of the present invention.

The following ingredients were added to a 15-gallon steel mixing tank:

4794.0 grams Dow Corning Q4-3667

12131.0 grams Union Carbide 24-32—a polystyrene and polyacrylonitrile grafted polyoxypropylene diol 16925.0 grams DOP—diluent 654.0 grams Linde 3A Molecular Sieve—water scavenger After mixing the above under a dry nitrogen blanket at room temperature for 16 hours,
1816.0 grams UpJohn Isonate 181
at 30° C. was added and mixed.

The resulting surfactant was tested as in Example 1 and showed a Hobart density of 30.5 lbs/ft$^3$ and which resulted in a high quality foam product having a density of about 12.1 lbs/ft$^3$ when processed as in Example 1.

EXAMPLE 4

This example is given to illustrate the use of a component with a functionality greater than two.

Using a one-pint container with stirring and
20.0 grams UpJohn 143L—a mixture of MDI and a trifunctional cycloadduct produced by introducing carbodiimide linkages in the MDI
20.0 grams Monsanto A-215—linear alkyl benzene diluent
to which was added a premix of
77.4 grams vacuum dried Petrarch PS-197—a carbinol terminated polydimethylsiloxane
113.1 grams Union Carbide 24-32—a polystyrene and polyacrylonitrile grafted polyoxypropylene diol
190.5 grams Monsanto A-215—linear alkyl benzene diluent
the mixture was stirred vigorously by hand and then mixed on a stirplate for about 25 minutes.

Using the same testing procedures as in Example 1, the system gave a Hobart density of 25 lbs/ft$^3$ employing 20.0 grams of surfactant.

EXAMPLE 5

This example illustrates the use of pure MDI in the manufacture of a surfactant of the present invention.

Following the synthesis and testing procedures as given in Example 1, the following were mixed:
105.4 grams Dow Corning Q4-3667
266.9 grams Union Carbide 24-32
372.3 grams DOP—diluent
14.4 grams Linde 3A Molecular Sieve—water scavenger
to the above mixture was added
27.6 grams UpJohn Isonate 125M—a mixture of isomers containing 98% 4,4' diphenyl methane diisocyanate and 2% 2,4'diphenyl methane diisocyanate (pure MDI)

The surfactant resulted in a Hobart density of 30.0 lbs/ft$^3$ and a high quality foam product having a density of about 12.9 lbs/ft$^3$ when processed as in Example 1.

EXAMPLE 6

This example is provided in order to illustrate the synthesis of a complex multipolymer surfactant using three hydroxyl terminated components. This example also illustrates the use of a polybutadiene diol for producing a surfactant for stabilizing a urethane formulation containing polybutadiene.

Using the same synthesis procedure as given in Example 1, a surfactant was produced from the following ingredients:
134.3 grams Dow Corning Q4-3667
135.9 grams Union Carbide E-351
97.1 grams Nisso PB G-2000—a polybutadiene diol having a hydroxyl functionality of between 1.6 and 2
367.7 grams DOP—diluent
14.6 grams Linde 3A Molecular Sieve—water scavenger
50.9 grams UpJohn Isonate 181

The surfactant produced resulted in a Hobart density of 35 lbs/ft$^3$ in the test system used in Example 1.

In a test system comprised of
202.0 grams Union Carbide 24-32
46.0 gram DPG—dipropylene glycol
106.0 grams Arco R-45HT—hydroxyl terminated polybutadiene having a functionality between 2.4 and 2.6
128.0 grams UpJohn 143L
17.7 grams surfactant This surfactant resulted in a Hobart density of 23.0 lbs/ft$^3$.

EXAMPLE 7

This example is provided to illustrate the synthesis of a surfactant for a polyester urethane formulation using a polyester prepolymer as the isocyanate component. The following ingredients were placed in a one-pint glass jar and mixed:
48.0 grams Petrarch PS197
50.0 grams Cyanaprene A-9—a polyester TDI prepolymer formed by reacting toluene diisocyanate with a polybutylene adipate diol
98.0 grams Methylene chloride—diluent
0.01 grams T-9—stannous octoate catalyst A combined mix of surfactant from four separate runs of the same composition as given above were evaluated in a Hobart test system containing
260.0 grams Cyanaprene A-9
45.9 grams Union Carbide PCP 0300—a polyester triol produced from polycaprolatone
16.1 grams surfactant The components and mixing bowl were preheated to 185° F. before the test and kept warm during testing by a heat gun to prevent solidification. The methylene chloride diluent was driven off by heating prior to use. A density of 32.3 lbs/ft$^3$ was obtained.

EXAMPLES 8 TO 39

The following examples represent a series of runs of a surfactant of the present invention wherein the silicone levels and the total OH to NCO ratios are changed from example to example. The synthesis and testing in each case is as given in Example 1 and total batch weights in each case was between 750 grams and 800 grams using the following components:

Dow Corning Q4-3667—hydroxyl terminated polyoxyethylene capped polydimethylsiloxane
Union Carbide E-351—polyoxypropylene diol
DOP—di-2 ethyl hexyl phthalate
Linde 3A Molecular—crystalline metal aluminum silicate Sieve
UpJohn Isonate 181—MDI partially extended with a low molecular weight polyether In each of the examples listed in the following table, the amount of DOP used in each batch was set equal to the total of polydimethylsiloxane and the polyoxypropylene diol used and the amount of the molecular sieve used was 2% of the total weight of the components other than the MDI.

Foams were produced using a mechanical frother and related equipment and the foam rating listed is a qualitative assessment of the foam produced using numerical values of from $-5$ to $+5$ where 0 corresponds to an acceptable material at a density of 17 lbs/ft$^3$.

TABLE 1

| OH/NCO Ratio | % OH Contrib. by Si Cont. Raw Material | WT % PDMS Groups of Total Reactive Raw Material | Hobart Froth Densities (lbs/ft³) 2 days | Hobart Froth Densities (lbs/ft³) 2 weeks | Approximate Weight Average Molecular Weight | Product Foam Rating |
|---|---|---|---|---|---|---|
| 1.55 | 15 | 4.5 | 36.5 | 43.5 | 19,800 | 0 |
| 1.55 | 30 | 9.3 | 27.5 | 30.0 | 21,400 | 0 |
| 1.55 | 50 | 16.3 | 31.5 | 32.5 | 20,500 | −2 |
| 1.55 | 70 | 24.1 | 48.5 | 53.5 | 23,400 | −5 |
| 1.45 | 15 | 4.4 | 37.5 | 39.5 | 22,600 | −1 |
| 1.45 | 30 | 9.2 | 26.0 | 26.5 | 22,000 | −3 |
| 1.45 | 50 | 16.2 | 26.5 | 31.5 | 20,100 | −5 |
| 1.45 | 90 | 32.6 | 59.0 | 61.0 | 16,200 | −5 |
| 1.3 | 15 | 4.4 | 37.0 | 39.5 | 21,800 | +1 |
| 1.3 | 30 | 9.1 | 26.0 | 26.5 | 25,300 | +1 |
| 1.3 | 50 | 16.0 | 26.5 | 30.5 | 23,000 | +3 |
| 1.3 | 70 | 23.7 | 43.5 | 45.0 | 19,500 | −5 |
| 1.3 | 90 | 32.3 | 55.0 | 57.5 | 19,300 | −5 |
| 1.2 | 15 | 4.4 | 27.0 | 44.5 | 33,500 | +2 |
| 1.2 | 30 | 9.0 | 18.0 | 21.5 | 54,200 | +5 |
| 1.2 | 50 | 15.9 | 27.0 | 29.0 | 35,600 | +5 |
| 1.2 | 50 | 15.9 | 21.0 | 27.0 | 34,700 | +4 |
| 1.2 | 70 | 23.5 | 42.5 | 43.5 | 22,300 | −5 |
| 1.2 | 70 | 23.5 | 45.0 | 49.0 | 28,100 | −5 |
| 1.2 | 90 | 32.0 | 62.0 | 55.5 | 21,100 | −5 |
| 1.1 | 15 | 4.3 | 24.5 | 27.5 | 41,000 | +4 |
| 1.1 | 30 | 9.0 | 19.5 | 34.0 | 42,700 | +5 |
| 1.1 | 50 | 15.7 | 20.0 | 25.0 | 37,600 | +5 |
| 1.1 | 50 | 15.7 | 18.0 | 37.5 | 38,500 | +5 |
| 1.1 | 70 | 23.2 | 58.0 | 43.5 | 38,300 | −5 |
| 1.1 | 70 | 23.2 | 55.0 | 51.5 | 50,100 | −5 |
| 1.1 | 90 | 31.6 | 64.0 | 62.5 | 19,700 | −5 |
| 1.05 | 15 | 4.3 | 55.0 | 30.5 | 59,500 | +3 |
| 1.05 | 30 | 8.9 | 20.0 | 24.5 | 42,500 | +4 |
| 1.05 | 50 | 15.6 | 21.0 | 21.0 | 43,500 | +4 |
| 1.05 | 70 | 23.1 | 57.0 | 41.0 | 32,700 | −5 |
| 1.05 | 90 | 31.6 | 65.0 | 65.0 | 38,300 | not tested |

TABLE II

| COMPONENT | COMPOSITION |
|---|---|
| Dow Corning-Q4-3667 | About 2400 molecular weight hydroxyl terminated polyoxyethylene capped polydimethylsiloxane with about 15 percent by weight of a 585 molecular weight polyoxyethylene with one vinyl and one hydroxyl termination. |
| Union Carbide-E-351 | About 2800 molecular weight oxyethylene capped polyoxypropylene diol. |
| Monsanto-A-215 | About 236 molecular weight linear alkyl benzene. |
| Linde-3A | A synthetically produced crystalline metal alumino-silicate. |
| UpJohn Isonate-181 | About 366 molecular weight mixture of pure diphenyl methane diisocyanate (molecular weight = 250) and diphenyl methane diisocyanate which has been reacted with a low molecular weight polyether diol forming a difunctional adduct. |
| Union Carbide-34-45 | About 300 molecular weight polyoxypropylene triol with polystyrene and polyacrylonitrile grafted onto the polyoxypropylene chain. Acrylonitrile content is 9.9% by weight, styrene content is 8.1% by weight. Thus, total molecular weight is about 3740. |
| Union Carbide-PCP 0200 | About 530 molecular weight polyester diol produced from caprolactone. |
| DPG (Dipropylene glycol) | About 134 molecular weight secondary ether diol. |
| UpJohn Isonate 143L | A mixture of MDI (diphenyl methane diisocyanate) and a trifunctional cycloadduct produced by introducing carbodiimide linkages in MDI. |
| DOP (di-2 ethyl hexyl phthalate) | About 390 molecular weight. Commonly called dioctyl phthalate (thus DOP). |
| T-9 (M&T Chemicals) | Stannous octoate with antioxidant. |
| Petrarch PS-197 (Petrarch Systems) | About 2400 molecular weight carbinol terminated polydimethyl siloxane. |
| Union Carbide 24-32 | Polymer diol as in Union Carbide 34-45 using Union Carbide E-351 as the base chain in which the acrylonitrile and styrene contents are 10% by weight each. |
| UpJohn Isonate 125M | About 250 molecular weight mixture of isomers containing 98% 4,4' diphenyl methane diisocyanate and 2% 2,4' diphenyl methane diisocyanate. |
| Nisso PB G-2000 (Nippon Soda Co.) | About 2000 molecular weight polybutadiene diol. |
| Arco RH-45T | About 2800 number average molecular weight hydroxyl terminated polybutadiene. |
| MeCl₂ (methylene chloride) | $CH_2Cl_2$, 84.9 molecular weight. |
| Cyanaprene A-9 (American Cyanamid) | About 2000 molecular weight polyester TDI prepolymer formed by reacting TDI (toluene diisocyanate) with a polybutylene adipate diol. |
| Union Carbide PCP 0300 | About 540 molecular weight polyester triol produced from polycaprolactone. |

Various modifications and variations of this invention will be obvious to those having skill in the art and it is understood that such modifications and variations are to be included within the purview of this application and the scope of the appended claims.

Having thus described the invention, what is claimed is:

1. A complex block multipolymer surfactant having a molecular weight of between about 15,000 and about 100,000 produced by combining:

(a) a linear polysiloxane having terminating groups containing a hydroxyl group, said linear polysiloxane having a molecular weight of between about 1,000 and about 5,000;
(b) at least one diol, said diol having a molecular weight of less than about 5,000; and
(c) a diisocyanate having isocyanate reactive groups, said diisocyanate having a molecular weight of between about 100 and about 2,000;

the ratio of hydroxyl groups to isocyanate reaction groups being from about 0.80:1.0 to about 1.16:1.0; and wherein said surfactant has a silicon content of between about 0.5 to about 35.0 percent by weight.

2. The complex block multipolymer surfactant of claim 1 wherein said polysiloxane is a polydimethylsiloxane having terminations containing carbinol groups.

3. The complex block multipolymer surfactant of claim 1 wherein at least one of said diols is selected from the group consisting of polyoxypropylenediol, polystyrene and polyacrylonitile grafted onto polyoxypropylenediol or polybutadienediol.

4. The complex block multipolymer surfactant of claim 1 wherein said diisocyanate is diphenyl methane diisocyanate.

5. The complex block multipolymer surfactant of claim 1 wherein said diisocyanate and at least one of said diols are prereacted before combining with the polysiloxane and any additional diols.

6. The complex block multipolymer surfactant of claim 4 wherein said diisocyanate and at least one of said diols are prereacted before combining with the polysiloxane and any additional diols.

7. The complex block multipolymer surfactant of claim 6 wherein a polyether diol is prereacted with said diphenyl methane diisocyanate.

8. The complex block multipolymer surfactant of claim 5 wherein a polyester diol is prereacted with toluene diisocyanate.

9. The complex block multipolymer surfactant of claim 1 wherein monofunctional components are used to control the molecular weight and molecular weight distribution.

10. The complex block multipolymer surfactant of claim 1 wherein more than one diol is used.

11. The complex block multipolymer surfactant of claim 1 wherein components having functionality of greater than two are used to produce branched surfactants.

12. The complex block multipolymer surfactant of claim 1 wherein said isocyanate is a mixture of diphenyl methane diisocyanate and a trifunctional cycloadduct of diphenyl methane diisocyanate.

13. The complex block multipolymer surfactant of claim 1 including the addition of a non-reactive diluent to control the surfactant viscosity and processing characteristics.

14. The complex block multipolymer surfactant of claim 1 including the addition of a catalyst to alter the reaction rates of the components.

15. The complex block multipolymer surfactant of claim 1 including a water scavenger to control the water content of the raw material.

16. The complex block multipolymer surfactant of claim 1 wherein said water scavenger is a molecular sieve.

17. A polyurethane foam containing a stabilizer comprising a complex block multipolymer surfactant having a molecular weight of between about 15,000 and about 100,000 produced by combining:
(a) a linear polysiloxane having terminating groups containing a hydroxyl group, said linear polysiloxane having a molecular weight of between about 1,000 and about 5,000;
(b) at least one diol, said diol having a molecular weight of less than about 5,000; and
(c) a diisocyanate having isocyanate reactive groups, said diisocyanate having a molecular weight of between about 100 and about 2,000;

the ratio of hydroxyl groups to isocyanate reaction groups being from about 0.80:1.0 to about 1.16:1.0; and wherein said surfactant has a silicon content of between about 0.5 to about 35.0 percent by weight.

* * * * *